United States Patent
Hess

(10) Patent No.: US 6,543,468 B2
(45) Date of Patent: Apr. 8, 2003

(54) INSTRUMENT INSTALLATION AND METHOD FOR TESTING IMPERVIOUSNESS IN A HIGH PRESSURE PROCESS

(76) Inventor: Martin Hess, Prinz-Eugen-Strasse 11, D-85051, Ingolstadt (DE)

(*) Notice: Subject to any disclaimer, the term of this patent is extended or adjusted under 35 U.S.C. 154(b) by 0 days.

(21) Appl. No.: 09/833,326

(22) Filed: Apr. 12, 2001

(65) Prior Publication Data

US 2001/0037828 A1 Nov. 8, 2001

(30) Foreign Application Priority Data

Apr. 15, 2000 (DE) .......................... 100 18 817

(51) Int. Cl.⁷ ................................. F16K 3/22
(52) U.S. Cl. ............... 137/15.11; 137/557; 137/312
(58) Field of Search ................. 137/312, 557, 137/15.11; 251/174; 73/866.5

(56) References Cited

U.S. PATENT DOCUMENTS

| | | | |
|---|---|---|---|
| 4,483,511 A | * 11/1984 | Kushida et al. | 251/174 |
| 4,575,045 A | 3/1986 | Martin et al. | |
| RE33,792 E | * 1/1992 | Makinen | 73/866.5 |
| 5,638,860 A | * 6/1997 | DeRoche | 137/493.8 |

FOREIGN PATENT DOCUMENTS

| | | |
|---|---|---|
| DE | 3119858 A 1 | 12/1982 |
| DE | 19723864 A 1 | 12/1998 |

* cited by examiner

*Primary Examiner*—Kevin Lee
(74) *Attorney, Agent, or Firm*—McNair Law Firm, P.A.

(57) ABSTRACT

The present invention relates to a measuring instrument installation on a process circuit capable of being subjected to a medium under high pressure, with a locking element between the measuring instrument and the process circuit. According to the invention the locking element is a ball valve 18 provided with a valve body as the ball housing and with a process circuit connection 2 and a measuring instrument connection 3. In addition a ball 7 which can be rotated back and forth between a pass position 6 and a lock position is installed in the ball housing, said ball being provided with a passage bore 8 that can be positioned in the pass position. Furthermore two ball seats 12, 13 pointing respectively in the direction of the process circuit connection 2 and of the measuring instrument connection 3 are provided, each being provided with a sliding sleeve 14, 15 spring-loaded and capable of sliding in the direction of the ball 7. Furthermore each sliding sleeve 14, 15 is connected to a sealing packing 19, 20 pressed in a ring-shaped manner against the ball 7, so that a ball space 25 which is not directly sealed off from the process circuit connection 2 and the measuring instrument connection 3 is constituted between the sealing packings 19, 20, whereby the ball housing 1 is provided in the area of the previously mentioned ball space 25 with a relief/bleed connection 26 with a connected actuated relief/bleed valve 27.

9 Claims, 2 Drawing Sheets

INSTRUMENT INSTALLATION AND METHOD FOR TESTING IMPERVIOUSNESS IN A HIGH PRESSURE PROCESS

FIELD OF THE INVENTION

The present invention relates to a measuring instrument installation on a process circuit that can be subjected to a medium under high pressure with a locking element between the measuring instrument, particularly in the form of a pressure transmitter, and the process circuit to test the imperviousness of the process circuit, and also relates to the removal of such a measuring instrument installation.

Mainly those measuring instrument installations are considered here which are used in processes with gaseous or liquid process media under high pressure in operation. In addition, the disclosure is centered on processes in which high pressures are built up e.g. in the cryogenic technology with fluid/gas change-overs.

BACKGROUND

A measuring instrument installation on a high-pressure process circuit is generally installed in such manner that a locking element that can be actuated as a pressure transmitter is installed between the process circuit and the measuring instrument.

For safety reasons, in particular for the removal of a measuring instrument or of a pressure transmitter when the process circuit is under pressure, it is a generally known measure to build up such a locking element by means of three valves in a so-called "double blocking-and-bleed" arrangement. For this purpose a valve is used on the side of the process circuit, the sealing seat of which is reinforced in the closing direction by the pressure on the side of the process circuit. In addition a valve is installed in the opposite direction on the measuring instrument side, so that the pressure prevailing in the measuring instrument or in the pressure transmitter reinforces this valve seat in the sealing direction. The two valves represent the "double blocking" arrangement. A third valve is installed in a "T" arrangement as a relief/bleed valve in the "bleed" function between these two valves. Before removing a measuring instrument or a pressure transmitter, the two first-mentioned valves are closed and the circuit between these valves is then relieved by means of the relief/bleed valve so that secure uncoupling is ensured of the segment of the high-pressure process circuit which must be opened when a measuring instrument is removed.

The installation of such an arrangement is expensive and requires relatively much space.

Furthermore a ball valve used as a stop valve is generally known, with a valve body as a ball housing, with a process circuit connection and a measuring instrument connection as well as with a ball in the ball housing that can be rotated between a pass position and a stop position. The ball is located between two ball seats, each with a sliding sleeve that is spring-loaded in direction of the ball and capable of sealed displacement and each with packing pressed in a ring-shaped manner against the ball. As a result a ball space is formed between the packings that is not directly sealed off from the process circuit connection and the measuring instrument connection. A ball seat arrangement of this type, with two spring-loaded ball seats or sliding sleeves with packings provides an extensively leak-free seal in a known manner, in particular, in case of pressure and temperature fluctuations. Due to the spring pressure, ball and seat wear is reduced, in particular, in case of pressure fluctuations and pressure surges.

It is furthermore known that the ball can be provided with a ball bore which provides a connection between the ball chamber and the process side when the ball valve is closed, so that pressure equalization takes place, especially with process media with great volume expansion.

It is an object of the present invention to develop a measuring instrument installation described herein above in such manner that, while the double blocking-and-bleed function is maintained, a considerably simpler, less expensive and space-saving arrangement becomes possible.

It is furthermore the object of the invention to provide a suitable process for the removal of a measuring instrument when using the measuring installation according to the invention.

These objects are attained by the invention with regard to the measuring instrument installation and with regard to the process.

SUMMARY OF THE INVENTION

According to a first aspect of the invention, the locking element is a ball valve with a valve body as a ball housing, with a process circuit connection and a measuring instrument connection as well as with a ball in the ball housing which can be twisted between a pass position and a lock position, said ball being provided with a passage bore that can be placed in the pass position. Furthermore two ball seats lying in the direction of the process circuit connection and two lying in the direction of the measuring instrument connection are provided, each with a sliding sleeve spring-loaded and sealed in the direction of the ball, each with a packing pressed in a ring-shaped manner against the ball. This creates a ball space between the packings which is not directly sealed off against the high-pressure zones, but at the same time the medium is able to enter this ball space under high pressure through leakage at the two sealing seats as well as during the locking process.

Furthermore the ball housing is provided with a passage to the environment as a relief/bleed connection in the area of this ball space to which a relief/bleed valve is connected.

The two spring-loaded ball seats can be regarded as two locking elements acting independently from each other in the sense of the initially mentioned "double blocking" function, since they seal off the corresponding connections from the ball on the process circuit side and on the measuring instrument side and from the ball space between these when in prescribed position.

The ball space between these ball seats acting in a "double blocking" function can now be connected to the environment according to the invention via a relief/bleed valve, so that the "bleed" function is possible for relief and/or bleeding.

In all, a "double blocking-and-bleed" function is created thereby in a very advantageous manner in a very compact, economical and technically safe and effective solution.

The measuring instrument installations with the characteristics described and claimed herein are advantageous and high-performing variations in design.

In a second aspect of the invention, a relief/bleed valve is included in form of a needle valve that can be screwed in, by means of which a relief and/or imperviousness test can be carried out in a very dosed manner.

The sliding sleeves are simply sealed by means of O-rings according to a third aspect of the invention whereby the sliding sleeves are spring-loaded in an advantageous manner by means of Belleville washers.

Still another aspect relates to the solution according to the invention in connection with a ball valve with straight circuit passage, so that the required geometrical conditions are advantageous. In principle however, it is also possible according to the invention to use a valve with a non-straight passage, e.g., a corner valve.

In yet another aspect, a ball valve can be used with conventional square wrench actuation.

Easy assembly of a ball valve is possible as an additional feature of the invention.

In still a further aspect, the invention is a process for the testing of imperviousness and for the removal of a measuring instrument, in particular of a pressure transmitter when the process circuit is subjected to high pressure in a measuring instrument installation as described in the foregoing aspects of the invention. In this case the following process steps must be carried out:

a) Closing the ball valve by rotating the ball into its locked position. As a result, the "double-blocking" functions with respect to the high pressure on the process circuit side and the measuring instrument side are established simultaneously in one step.

b) In a second process step, the relief/bleed valve, preferably in form of a needle valve, is opened at least partially. An imperviousness test of the two ball seats on the one hand, and on the other hand a relief of the ball space are effected thereby. If the ball seats are tight, at most a brief escape of medium takes place. In case of a gaseous medium this can be detected through a brief hissing sound. Thereby the "double blocking-and-bleed" function and reliable separation of the measuring instrument connection from the high-pressure process circuit are ensured.

c) In this way the measuring device, in particular a pressure transmitter, can be removed in a further process step without safety risk.

BRIEF DESCRIPTION OF THE DRAWINGS

In the drawings, which included by way of illustrations and not limitations.

DETAILED DESCRIPTION

Figure 1:
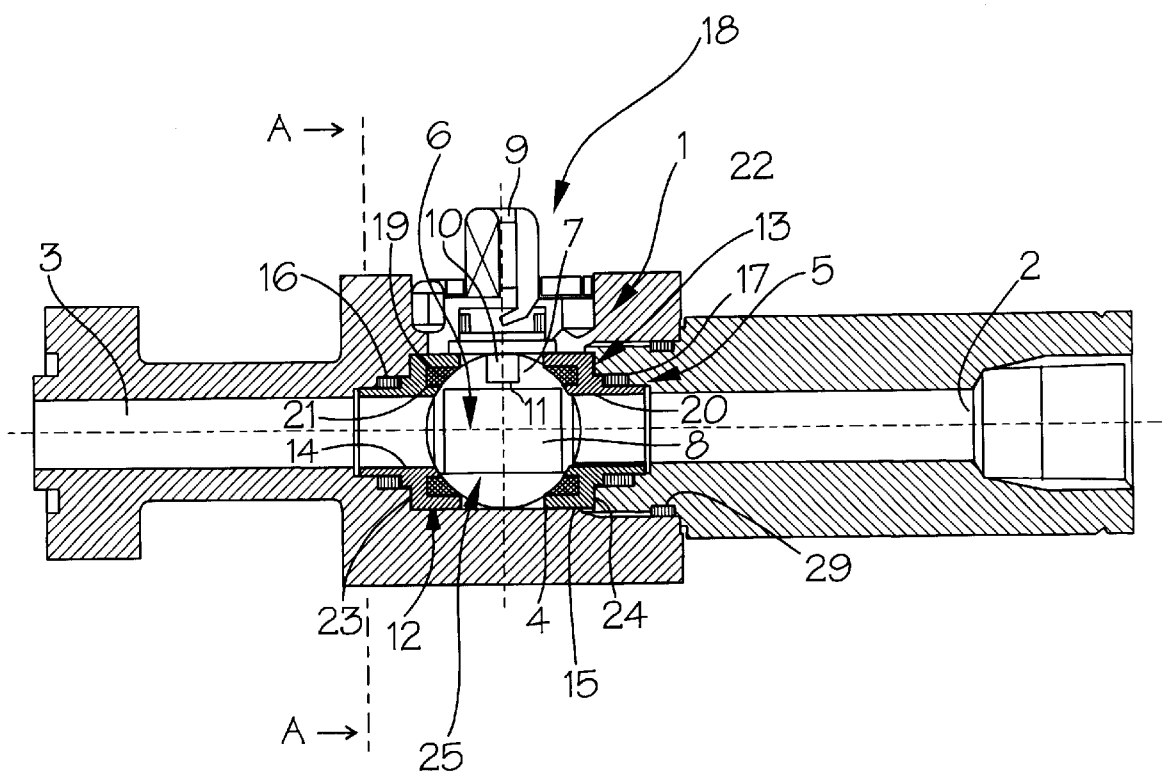
FIG. 1 shows a schematic cross-section through a ball valve with a ball housing in form of a valve body as well with a process circuit connection and a measuring instrument connection.

FIG. 1 shows a schematic cross-section through a ball valve 18 with a ball housing 1 in form of a valve body that has a connection 2 on the side of the process circuit and a connection 3 on the side of the measuring instrument connection.

As can further be seen in FIG. 1, the ball housing 1 is provided with a ball receiving chamber 4 facing the process circuit connection 2 with a receiving opening 5 through which a rotatable ball 7 can be inserted into the ball bearing housing 1.

At the end across from the receiving opening 5 the measuring instrument connection 3 follows the ball housing 1 in form of a connecting branch. This connecting branch 3 can be connected to a measuring instrument, e.g. a pressure transmitter, however this is not shown here. As FIG. 1 furthermore shows, the measuring instrument connection 3 also has a smaller diameter than the receiving opening 5.

FIG. 1 furthermore shows that the ball 7 has a passage bore 8 that establishes a connection between the measuring instrument connection 3 and the process circuit connection 2 in a pass position 6 as shown in FIG. 1. The ball 7 is rotated in this case by means of a square wrench 9 which can interact with a shaft end 10 held tightly in the ball receiving space 4 in a recess 11 and can transmit the rotational movement.

In addition, two ball seats 12, 13 lying respectively in the direction of the process circuit connection 2 and of the measuring instrument connection 3 are provided, each of said ball seats being provided with a displaceable sliding sleeve 14, 15, spring-loaded in the direction of the ball 7 via Belleville washers 23, 24 which are shown very schematically in this drawing, each sleeve being sealed off from the measuring instrument connection 3 by means of an O-ring seal 16, 17.

The seal between the ball 7 and the sliding sleeves 14, 15 is effected by means of a packing 19, 20 pressed in ring shape against the ball 7 and seated in a corresponding groove 21, 22 in the sliding sleeve 14, 15.

Figure 2:
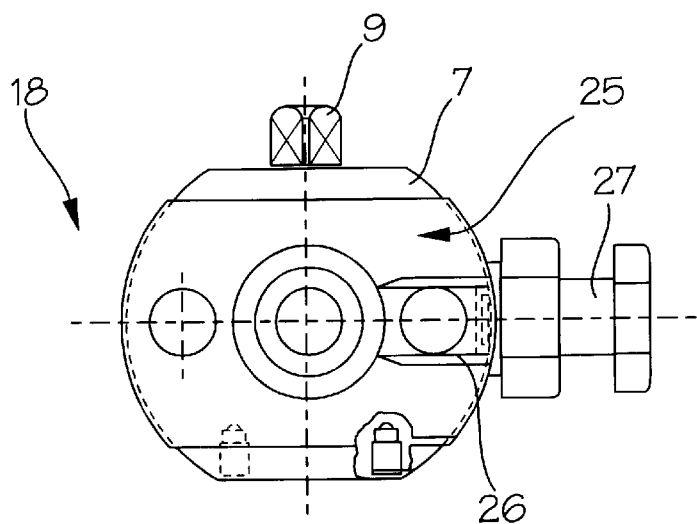
FIG. 2 shows a schematic sectional view of the ball valve with relief/bleed valve; and, FIG. 3 shows a schematic to view of the ball valve together with the process circuit connection and the measuring instrument connection according to FIG. 1.

As FIG. 1 further shows, the packings 19, 20 are placed here in such manner that a ball space 25 is formed between them that is not directly sealed off from the process circuit connection 2 and the measuring instrument connection 3, whereby the ball housing 1 is provided in the area of this ball space 25 with a threaded bore serving as relief/bleed valve connection 26 to a relief/bleed valve 27 in form of a needle valve as can be seen in particular in FIG. 2 which is merely a very schematic cross-sectional representation of FIG. 1.

Figure 3:
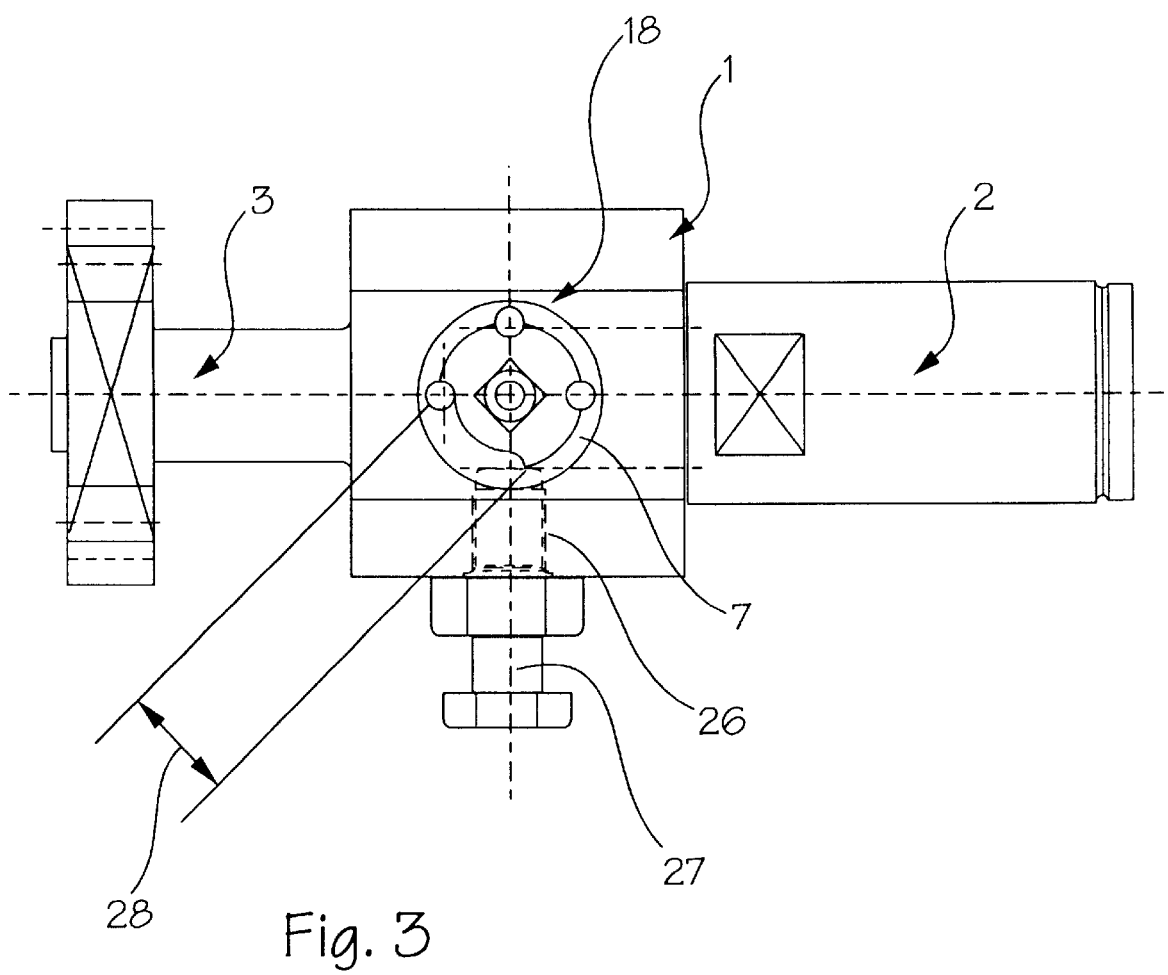

In the same manner the relief/bleed valve connection 26, together with the needle valve 27, can be seen in FIG. 3 which is a schematic top view of the structure according to FIG. 1, whereby FIG. 3 also schematically shows the adjusting path 28 of the ball 7.

As also can be seen in FIG. 1, during assembly and following the insertion of the ball 7, of the sliding sleeves 14, 15 of the sealing packings 19, 20, the O-ring seals 16, 17 and the Bellville washers 23, 24, the process circuit connection 2 is screwed into the receiving opening 5 and is sealed by means of an O-ring seal 29. Alternatively, the process circuit connection 2 can also be welded in.

The operation of this structure is also explained in further detail through FIGS. 1 to 3:

When the ball valve 18 is locked by rotating the ball 7 from the pass position 6 into its lock position which is not shown here, a "double blocking" function is established with respect to the high pressure on the process circuit side and the measuring instrument side. Following this, in a second process step, the relief/bleed valve 27 in form of a needle valve 27 can be opened at least partially so that on the one hand a test of imperviousness of the two ball seats 12, 13 and on the other hand a relief of the ball space takes place. When the balls seats 12, 13 are well sealed, at most a brief escaping of medium takes place. If a gaseous medium is used, this can be detected through a brief hissing sound. In this manner a simple and economical as well a space-saving arrangement with a "double blocking-and-bleed" function in combination with secure uncoupling of the measuring instrument connection 3 from the high-pressure process circuit is made possible. The measuring instrument that is not shown here, e.g., a pressure transmitter, can then be installed in another process step without any safety risk.

Other embodiments of the invention may occur to those skilled in the art upon reading the foregoing specification but the scope of the invention is limited only by the following claims:

What is claimed is:

1. A measuring instrument installation on a circuit that can be subjected to a medium under high pressure comprising a measuring instrument with a locking element between the measuring instrument, and said locking element comprising a ball valve (18) which further comprises:
   a) a valve body comprising ball housing (1) having a process circuit connection (2) and a measuring instrument connection (3);
   b) a ball (7) positioned in said housing so that said ball can be rotated back and forth in the ball housing (1) between a pass position (6) and a lock position, said ball (7) being provided with a passage bore (8) that can be placed in the pass position (6);
   c) two ball seats (12, 13), said housing disposed with each laying respectively in the direction of the process circuit connection (2) and in the direction of the measuring instrument connection (3), each of said ball seats being provided with a displaceable sliding sleeve (14, 15) spring-loaded and sealed on the ball (7);
   d) sealing packings (19, 20) pressed in a ring-shaped manner against the ball (7), thereby constituting a ball space (25) between the sealing packings (19, 20) that is not directly sealed off from the process circuit connection (2) and the measuring instrument connection (3); and,
   e) the ball housing (1) being provided with a relief/bleed connection (26) with a connected relief/bleed valve (27) capable of being actuated in close proximately to the ball housing (1).

2. A measuring instrument installation as in claim 1, wherein the relief/bleed connection to the ball space (25) is made in form of a threaded bore and wherein the relief/bleed valve which can be actuated is disposed in the bore in the form of a needle valve (27).

3. A measuring instrument installation as in claim 1 or 2, wherein each of the sliding sleeves (14, 15) is sealed from the measuring instrument connection by at least one O-ring (16, 17).

4. A measuring instrument installation as in claim 1 wherein the spring-loading of each sliding sleeve (14, 15) is effected by means of at least one Belleville washer (23, 24).

5. A measuring instrument installation as in claim 1 wherein the process circuit connection (2) and the measuring instrument connection (3) are across from and offset by 90° relative to the pivotal axis of the ball and in that the ball (7) is provided with a straight passage bore (8).

6. A measuring instrument installation as in claim 1 wherein the ball (7) can be rotated by means of a square wrench (9) that acts upon a shaft end (10) tightly held in a recess (11) of the ball (7) and transmits the rotational movement.

7. A measuring instrument installation as in claim 1 wherein the valve body has a ball-receiving space (4) open on one side, with a receiving opening (5) followed in one piece by a connecting branch across from the receiving opening, whereby the connecting branch has a smaller diameter than the receiving opening (5) and wherein a second connecting branch is inserted tightly as an additional component into the receiving opening (5) preferably by being screwed in or welded in after the installation of the ball (7), the sliding sleeve (14, 15), the seals (16, 17, 19, 20) and the springs (23, 24).

8. A process to test the imperviousness of and for the removal of a measuring instrument when a process circuit is subjected to high pressure in a measuring instrument installation according to claim 1 comprising the steps of:
   1) locking the ball valve (18) by rotating the ball (7) into its lock position,
   2) at least partially opening the relief/bleed valve (27) to test imperviousness and to relieve pressure in the ball space (25), with medium escaping at most for a brief moment in case that the ball seats (12, (13) are sealed,
   c) removal of the measuring instrument from the measuring instrument connection (3).

9. The method of claim 8 wherein the measuring instrument is a pressure transmitter.

* * * * *